W. SMITH.
Harness for Preventing Horses from Kicking.

No. 216,705. Patented June 17, 1879.

UNITED STATES PATENT OFFICE.

WALTER SMITH, OF ORWELL, VERMONT.

IMPROVEMENT IN HARNESS FOR PREVENTING HORSES FROM KICKING.

Specification forming part of Letters Patent No. 216,705, dated June 17, 1879; application filed March 28, 1879.

*To all whom it may concern:*

Be it known that I, WALTER SMITH, of Orwell, in the county of Addison, and in the State of Vermont, have invented certain new and useful Improvements in Harness for Preventing Horses from Kicking; and do hereby declare that the following is a full, clear, and exact description thereof, reference being had to the accompanying drawings, and to the letters of reference marked thereon, making a part of this specification.

The nature of my invention consists in the construction of a device for preventing a horse from kicking in harness or at any time when in use, as will be hereinafter more fully set forth.

In order to enable others skilled in the art to which my invention appertains to make and use the same, I will now proceed to describe its construction and operation, referring to the annexed drawings, in which—

Figure 1:
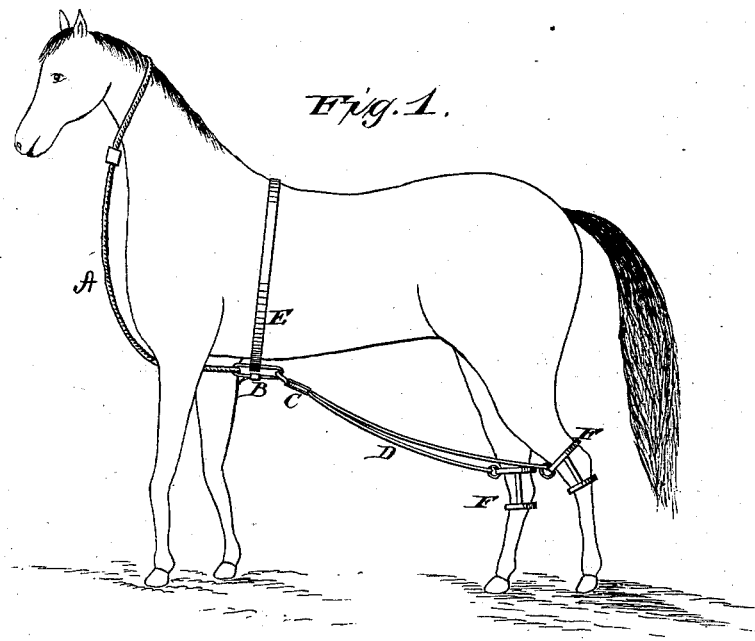
Figure 2:
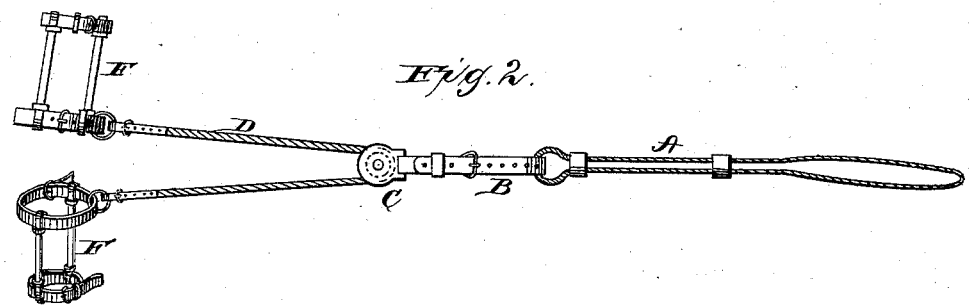

Figure 1 shows the application of my invention to a horse. Fig. 2 is a view of the device itself.

A represents a rope passing over the neck of the horse, down in front and between the fore legs, and attached to a strap, B, with knot or otherwise.

The strap B is provided with buckle and loops, to be lengthened or shortened, as required, and forms connection between the rope A and pulley-block C. The strap B is held up by the girth E, as shown.

D is a rope passing through the pulley-block C, and its ends connected to harnesses F F, fastened to the hind legs of the horse. Instead of a rope, D, a round strap may be used.

Each harness F consists of two straps buckled around the leg and connected by a single strap, allowing free use of the leg and joint. The rope or round strap D allows the free use by the horse of the legs in traveling.

This device is very simple, and when adjusted to the horse, as shown, will effectually prevent his kicking, and at the same time will not in the least interfere with his locomotion.

Having thus fully described my invention, what I claim as new, and desire to secure by Letters Patent, is—

The double harnesses F F, each composed of two straps adapted to be buckled around the leg, one above and the other below the joint, and connected by a strap on each side, in combination with the rope or strap D, pulley-block C, strap B, and neck-rope A, all substantially as and for the purposes herein set forth.

In testimony that I claim the foregoing I have hereunto set my hand this 20th day of March, 1879.

WALTER SMITH.

Witnesses:
JOHN C. HOLLEMBACK,
D. M. ARNOLD.